US010377238B2

(12) United States Patent
Watanabe

(10) Patent No.: US 10,377,238 B2
(45) Date of Patent: Aug. 13, 2019

(54) VEHICULAR TORQUE CONTROL DEVICE AND TORQUE CONTROL METHOD

(71) Applicant: Robert Bosch GmbH, Stuttgart (DE)

(72) Inventor: Takuya Watanabe, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 15/533,857

(22) PCT Filed: Sep. 22, 2015

(86) PCT No.: PCT/IB2015/001839

§ 371 (c)(1),
(2) Date: Jun. 7, 2017

(87) PCT Pub. No.: WO2016/124962

PCT Pub. Date: Aug. 11, 2016

(65) Prior Publication Data

US 2017/0326987 A1 Nov. 16, 2017

(30) Foreign Application Priority Data

Dec. 10, 2014 (JP) ................................ 2014-250310

(51) Int. Cl.
*B60L 3/10* (2006.01)
*B60T 8/17* (2006.01)
(Continued)

(52) U.S. Cl.
CPC .............. *B60L 3/106* (2013.01); *B60K 28/16* (2013.01); *B60T 8/175* (2013.01); *B60T 8/1706* (2013.01);
(Continued)

(58) Field of Classification Search
CPC ... B60K 28/16; Y02T 10/7258; B60T 8/1706; B60T 8/175; B60T 2250/042;
(Continued)

(56) References Cited

U.S. PATENT DOCUMENTS

| | | | | |
|---|---|---|---|---|
| 5,928,302 A | | 7/1999 | Fukada | |
| 6,719,076 B1 * | | 4/2004 | Tabata .................. | B60K 31/00 180/65.7 |
| 2001/0025219 A1 | | 9/2001 | Ohba et al. | |
| 2004/0040375 A1 * | | 3/2004 | Kadota .................... | B60K 6/00 73/115.02 |
| 2004/0235613 A1 * | | 11/2004 | Aoki ..................... | B60W 20/10 477/3 |
| 2009/0227407 A1 * | | 9/2009 | Kamada ................. | B60K 6/445 475/5 |

(Continued)

FOREIGN PATENT DOCUMENTS

| | | |
|---|---|---|
| EP | 1944186 | 7/2008 |
| EP | 2783937 | 10/2014 |

(Continued)

OTHER PUBLICATIONS

International Search Report for Application No. PCT/IB2015/001839 dated Feb. 16, 2016 (English Translation, 2 pages).

*Primary Examiner* — Atul Trivedi
(74) *Attorney, Agent, or Firm* — Michael Best & Friedrich LLP

(57) ABSTRACT

There is provided a configuration, including a storage unit that stores a theoretical driving wheel rotating speed based on a correspondence relationship with a predetermined engine speed in each gear stage of a transmission of a vehicle; gear stage detection means for detecting the gear stage when currently travelling; engine speed detection means for detecting an engine speed; driving wheel rotating speed detection means for detecting a driving wheel rotating speed; and torque control means for controlling output torque, in which the output torque is increased so that a current driving wheel rotating speed becomes close to the theoretical driving wheel rotating speed when a relative value of a calculated value which is calculated by using the detected driving wheel rotating speed with respect to a
(Continued)

calculated value which is calculated by using the theoretical driving wheel rotating speed is equal to or greater than a first threshold value.

16 Claims, 4 Drawing Sheets

(51) Int. Cl.
*B60K 28/16* (2006.01)
*B60T 8/175* (2006.01)
*B60W 10/10* (2012.01)
*B60W 30/18* (2012.01)

(52) U.S. Cl.
CPC ...... *B60W 10/10* (2013.01); *B60W 30/18172* (2013.01); *B60L 2240/421* (2013.01); *B60L 2240/423* (2013.01); *B60L 2240/461* (2013.01); *B60L 2240/486* (2013.01); *B60L 2240/507* (2013.01); *B60T 2250/042* (2013.01); *B60T 2270/211* (2013.01); *B60Y 2200/91* (2013.01); *B60Y 2300/18175* (2013.01); *B60Y 2300/60* (2013.01); *Y02T 10/7258* (2013.01)

(58) Field of Classification Search
CPC ............ B60T 2270/211; B60W 10/10; B60W 30/18172; B60L 3/106; B60L 2240/421; B60L 2240/423; B60L 2240/461; B60L 2240/486; B60L 2240/507; B60Y 2300/18175; B60Y 2300/60; B60Y 2200/91
USPC .......................................................... 701/22
See application file for complete search history.

(56) References Cited

U.S. PATENT DOCUMENTS

2009/0227408 A1* 9/2009 Imamura ............... B60W 20/10 475/5
2010/0004089 A1* 1/2010 Iwase .................... B60W 20/15 477/3
2010/0041511 A1* 2/2010 Tabata ................ F16H 61/0204 477/3
2010/0125019 A1* 5/2010 Tabata ................... B60K 6/365 477/3
2010/0197449 A1* 8/2010 Imamura .................. B60K 6/40 477/3
2013/0013161 A1* 1/2013 Otsubo ................. B60W 10/06 701/52
2015/0057862 A1* 2/2015 Sato ....................... B60K 6/445 701/22

FOREIGN PATENT DOCUMENTS

JP H094483 A 1/1997
JP 09267733 10/1997
JP 2005178689 7/2005

* cited by examiner

VEHICULAR TORQUE CONTROL DEVICE AND TORQUE CONTROL METHOD

BACKGROUND OF THE INVENTION

The present invention relates to a vehicular torque control device and a torque control method for controlling output torque when particularly sudden clutch connection operation or a shift-down of a gear is performed.

In the related art, an engine output control device of a vehicle, such as a car, generally employs a configuration for detecting a slipping state of a driving wheel, initiating control at the moment when the slipping state is generated in the driving wheel, restarting supply of fuel to an engine by releasing a stopped state of the supply of the fuel, reducing an effect of an engine brake by increasing an engine speed, and preventing generation of a slip of the driving wheel.

When a braking force by the engine brake is exerted, the slip at the driving wheel, for example, a rear wheel of a rear wheel driving vehicle, is likely to be generated as a load ratio which acts on the front and rear wheels that support a load of a vehicle body decreases at the rear wheel together with an increase of the load at a front wheel. At this time, in an engine output braking device in the related art, as the control is initiated at the moment when the slipping state is generated at the rear wheel, the supply of the fuel to the engine is restarted, and the braking force by the engine brake is reduced, the vehicle is prevented from being in a serious slipping state.

For example, in Japanese Patent No. 3454011, a braking force control device of a rear wheel driving vehicle which prevents a vehicle from being in a spinning state even when the vehicle is turning in a state where a slip ratio of a rear wheel is excessive on a road surface having a low coefficient of friction, by allowing a yaw moment in an anti-spin direction which is given to the vehicle to have a size which corresponds to the slip ratio of the rear wheel, as a target slip ratio of a turning outer side front wheel is calculated based on the slip ratio of the rear wheel so that the target slip ratio of the turning outer side front wheel increases as the slip ratio of the rear wheel increases, the braking force of the turning outer side front wheel is controlled so that the slip ratio of the turning outer side front wheel becomes the target slip ratio, and the braking force is given to the turning outer side front wheel, is disclosed. In other words, the braking force control device described in Japanese Patent No. 3454011 employs a configuration in which the braking force of the front wheel is controlled so that the slip ratio of the front wheel becomes the target slip ratio after calculating the target slip ratio of the front wheel which is a driven wheel based on the slip ratio of the rear wheel which is a driving wheel, and the control is initiated at the moment when the slipping state is generated at the rear wheel.

However, in a case of a motorcycle, when the slipping state is generated at the rear wheel (driving wheel) as the gear is shifted down and the engine brake is suddenly operated, similarly to the device described in Japanese Patent No. 3454011, in the configuration in which the control is initiated at the moment when the slipping state is generated at the rear wheel (driving wheel), there are many cases where the vehicle body is already in an unstable state and a driver feels an anxiety. For this reason, it is desirable that means which can perform the control before the slipping state is generated at the rear wheel is developed in case of the motorcycle. In particular, during cornering travelling, there are many cases where the motorcycle travels by inclining the vehicle body while reducing the speed in a state where the gear is shifted down and the engine brake is operated. In this case, it is assumed that it becomes too late to initiate the control after detecting the slip ratio of the rear wheel (driving wheel), and in the worst case, there is a problem in terms of safety since a situation where the vehicle is overturned is assumed.

SUMMARY OF THE INVENTION

An object of the present invention is to provide a vehicular torque control device and a torque control method which improve stability of a vehicle body when an engine brake is operated by providing torque control means that can suppress generation of a slip at a rear wheel by initiating torque control in an early stage before the slip is practically generated at the rear wheel (driving wheel) due to a force of the engine brake that is exerted when a particularly sudden clutch connection is operated or when a shift-down of a gear is operated, for example.

In order to achieve the above-described object, a main configuration of the present invention is as follows.

(1) A vehicular torque control device, including: a storage unit that stores a theoretical driving wheel rotating speed based on a correspondence relationship with a predetermined engine speed in each gear stage of a transmission of a vehicle; gear stage detection means for detecting the gear stage in current travelling; engine speed detection means for detecting an engine speed in current travelling; driving wheel rotating speed detection means for detecting a driving wheel rotating speed in current travelling; and torque control means for controlling output torque in current travelling, in which the output torque is increased so that a current driving wheel rotating speed becomes close to the theoretical driving wheel rotating speed when a relative value of a calculated value which is calculated by using the detected driving wheel rotating speed with respect to a calculated value which is calculated by using the theoretical driving wheel rotating speed is equal to or greater than a first threshold value.

(2) The vehicular torque control device according to the above-described (1), in which control of the output torque is initiated when a first gear stage is shifted down to a second gear stage.

(3) The vehicular torque control device according to the above-described (2), in which the storage unit further stores the theoretical drive ratio calculated from the predetermined engine speed and the theoretical driving wheel rotating speed, in which the device further includes: drive ratio calculating means for calculating a current drive ratio from the engine speed and the driving wheel rotating speed which are detected based on the second gear stage; and calculating means for calculating a difference and/or a rate of the drive ratio from a theoretical drive ratio and the current drive ratio in the second gear stage, and in which the relative value is the difference and/or the rate of the drive ratio.

(4) The vehicular torque control device according to the above-described (1), (2), or (3), in which the relative value is the difference and/or the ratio between the theoretical driving wheel rotating speed and the detected driving wheel rotating speed.

(5) The vehicular torque control device according to any one of the above-described (1) to (4), further including: clutch connection detection means for detecting clutch connection, in which the torque control means controls the output torque based on a clutch connection signal from the clutch connection detection means.

(6) The vehicular torque control device according to any one of the above-described (1) to (5), in which the torque control means ends the control of the output torque at the moment when the relative value is equal to or less than a second threshold value which is smaller than the first threshold value set in advance.

(7) The vehicular torque control device according to the above-described (6), in which the first threshold value and the second threshold value are calculated from at least one type of travelling information among the detected gear stage, the detected engine speed, and the detected driving wheel rotating speed, and in which the first threshold value and the second threshold value are variably set.

(8) The vehicular torque control device according to the above-described (7), in which the travelling information further includes at least one of external sensor information, clutch information, torque information, an accelerator opening degree, and an engine valve opening degree.

(9) The vehicular torque control device according to the above-described (7) or (8), in which a control amount of the output torque is determined based on the travelling information.

(10) A motor torque control device for an electric vehicle, including: a storage unit that stores a theoretical driving wheel rotating speed based on a correspondence relationship with a predetermined motor rotating speed of an electric motor of a vehicle which uses the electric motor as a power source; gear stage detection means for detecting a gear stage in current travelling; motor rotating speed detection means for detecting the motor rotating speed in current travelling; driving wheel rotating speed detection means for detecting a driving wheel rotating speed in current travelling; and motor torque control means for controlling motor output torque in current travelling, in which the motor output torque is increased so that a current driving wheel rotating speed becomes close to the theoretical driving wheel rotating speed when a relative value of a calculated value which is calculated by using the detected driving wheel rotating speed with respect to a calculated value which is calculated by using the theoretical driving wheel rotating speed is equal to or greater than a first threshold value.

(11) A vehicular torque control method which uses a torque control device, including a storage unit that stores a theoretical driving wheel rotating speed based on a correspondence relationship with a predetermined engine speed in each gear stage of a transmission of a vehicle; gear stage detection means for detecting the gear stage in current travelling; engine speed detection means for detecting an engine speed in current travelling; driving wheel rotating speed detection means for detecting a driving wheel rotating speed in current travelling; and torque control means for controlling output torque in current travelling, the method including: detecting a gear stage, an engine speed, and a driving wheel rotating speed during the current travelling; and increasing the output torque so that a current driving wheel rotating speed becomes close to the theoretical driving wheel rotating speed when a relative value of a calculated value which is calculated by using the detected driving wheel rotating speed with respect to a calculated value which is calculated by using the theoretical driving wheel rotating speed is equal to or greater than a first threshold value.

(12) The vehicular torque control method according to the above-described (11), further including: initiating control of the output torque when a first gear stage is shifted down to a second gear stage.

(13) The vehicular torque control method according to the above-described (12), further including: causing the storage unit to further store a theoretical drive ratio calculated from the predetermined engine speed and the theoretical driving wheel rotating speed; calculating the current drive ratio from the engine speed and the driving wheel rotating speed which are detected based on the second gear stage; and calculating a difference and/or a rate of the drive ratio from the theoretical drive ratio and the current drive ratio in the second gear stage, in which the relative value is the difference and/or the rate of the drive ratio.

(14) The vehicular torque control method according to above-described (11), (12), or (13), in which the relative value is the difference and/or the rate between the theoretical driving wheel rotating speed and the detected driving wheel rotating speed.

(15) The vehicular torque control method according to any one of the above-described (11) to (14), further including: detecting clutch connection; and increasing the output torque based on a clutch connection signal from clutch connection detection means.

(16) The vehicular torque control method according to any one of the above-described (11) to (15), further including: ending the control of the output torque at the moment when the relative value is equal to or less than a second threshold value which is smaller than the first threshold value set in advance.

(17) The vehicular torque control method according to the above-described (16), further including: calculating the first threshold value and the second threshold value from travelling information obtained from the detected gear stage, the detected engine speed, and the detected driving wheel rotating speed, in which the first threshold value and the second threshold value are variably set.

(18) The vehicular torque control method according to the above-described (17), in which the travelling information further includes at least one of external sensor information, clutch information, torque information, an accelerator opening degree, and an engine valve opening degree.

(19) The vehicular torque control method according to the above-described (17) or (18), further including: determining a control amount of the output torque based on the travelling information.

(20) A motor torque control method for an electric vehicle which uses a motor torque control device, including a storage unit that stores a theoretical driving wheel rotating speed based on a correspondence relationship with a predetermined motor rotating speed of an electric motor of a vehicle which uses the electric motor as a power source; gear stage detection means for detecting a gear stage in current travelling; motor rotating speed detection means for detecting the motor rotating speed in current travelling; driving wheel rotating speed detection means for detecting a driving wheel rotating speed in current travelling; and motor torque control means for controlling motor output torque in current travelling, the method including: increasing the motor output torque so that a current driving wheel rotating speed becomes close to the theoretical driving wheel rotating speed when a relative value of a calculated value which is calculated by using the detected driving wheel rotating speed with respect to a calculated value which is calculated by using the theoretical driving wheel rotating speed is equal to or greater than a first threshold value.

According to the present invention, a storage unit that stores a theoretical driving wheel rotating speed based on a correspondence relationship with a predetermined engine speed in each gear stage of a transmission of a vehicle; gear stage detection means for detecting the gear stage when currently travelling; engine speed detection means for detecting an engine speed; driving wheel rotating speed detection means for detecting a driving wheel rotating speed; and torque control means for controlling output torque, are provided, and the output torque can be increased so that a current driving wheel rotating speed becomes close to the theoretical driving wheel rotating speed when a relative value of a calculated value which is calculated by using the detected driving wheel rotating speed with respect to a calculated value which is calculated by using the theoretical driving wheel rotating speed is equal to or greater than a first threshold value. In this configuration, since control intervention of the output torque can be determined by using the engine speed and the driving wheel rotating speed of a driving system, it is possible to perform the intervention of the torque control earlier than the case of the related art in which the control intervention of the output torque is initiated after detecting the slip based on the rotating speed of the driven wheel and the driving wheel, for example. As a result, it is possible to prevent the vehicle body from being unstable due to the slip, to give the driver a relief, and to avoid the overturn of the vehicle.

BRIEF DESCRIPTION OF THE DRAWINGS

FIG. 3(*a*) is a view illustrating a relationship between a front wheel (driven wheel) speed and a rear wheel (driving wheel) speed, and time. FIG. 3(*b*) is a view illustrating a relationship between torque control information and time. In addition, FIG. 3(*c*) is a view illustrating a relationship between a current drive ratio and a theoretical drive ratio and time.

DETAILED DESCRIPTION

Next, an embodiment of a torque control device according to the present invention will be described hereinafter with reference to the drawings. In addition, in the following embodiment, examples of torque control means 300 include an antilock brake system (ABS), a drag torque control (DTC), and an electrical control unit (ECU).

Figure 1:
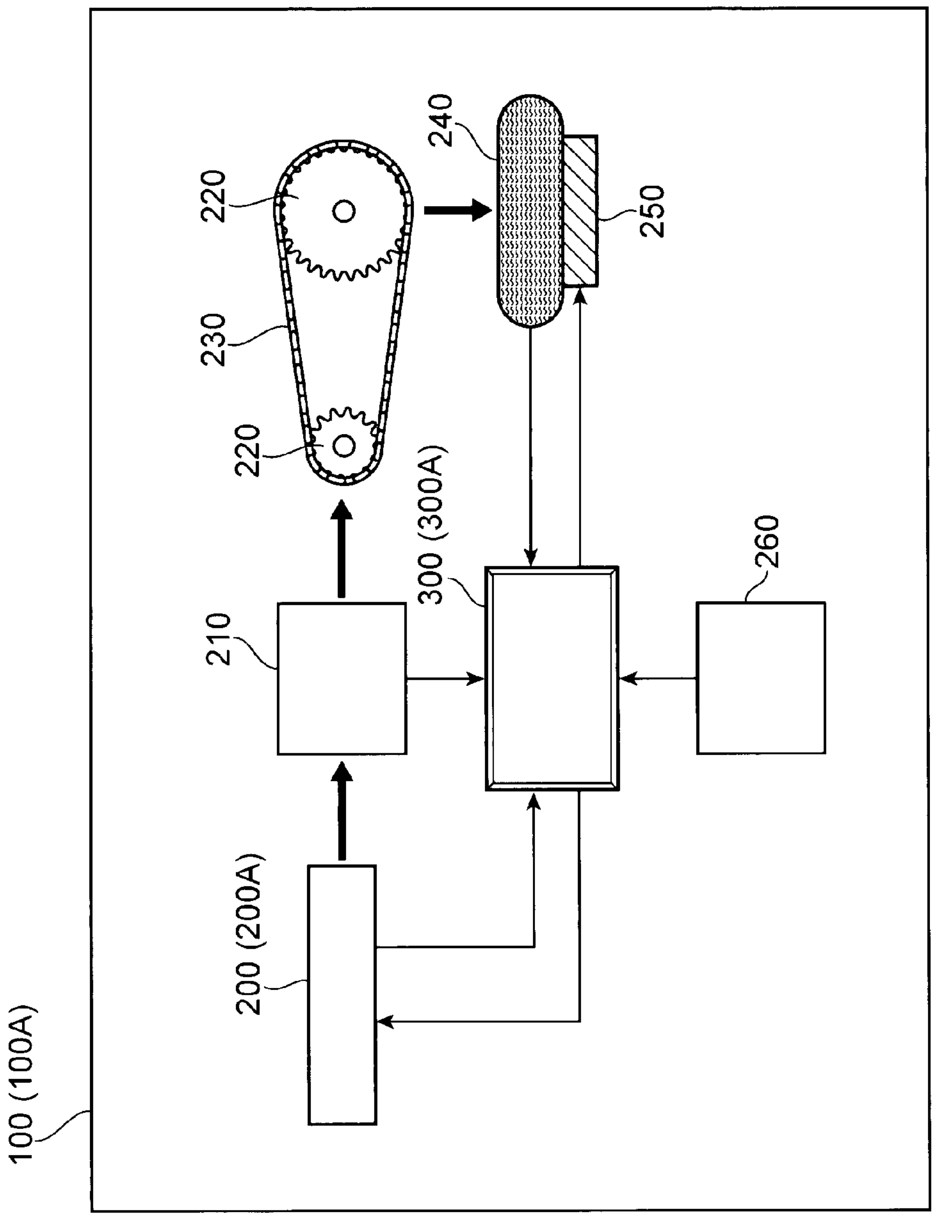
FIG. 1 is a view conceptually illustrating a configuration of a torque control device which includes torque control means.
Figure 2:
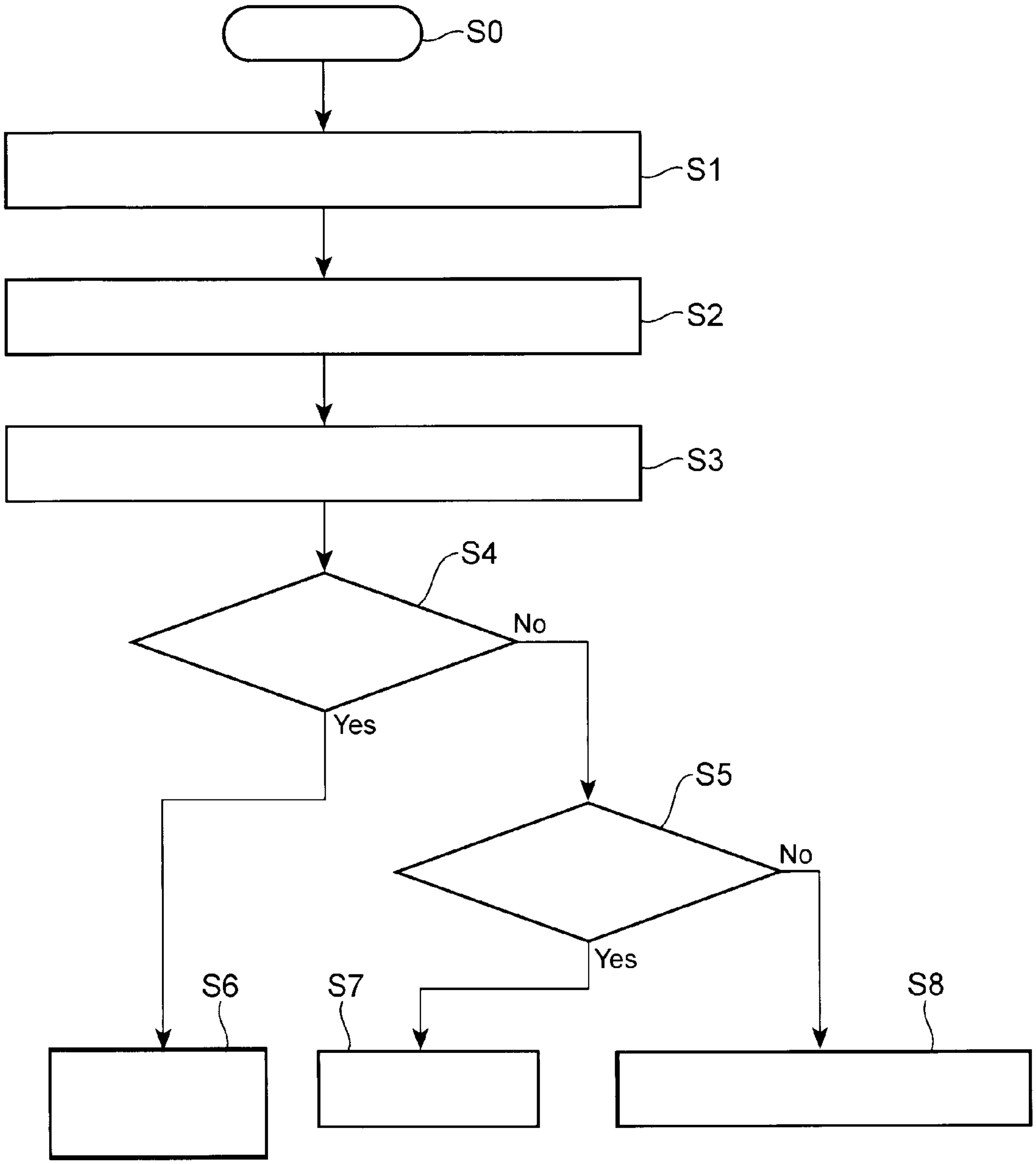
FIG. 2 is a view illustrating an example of a flow of determination of the initiation of torque control.
Figures 3A, 3B, 3C:
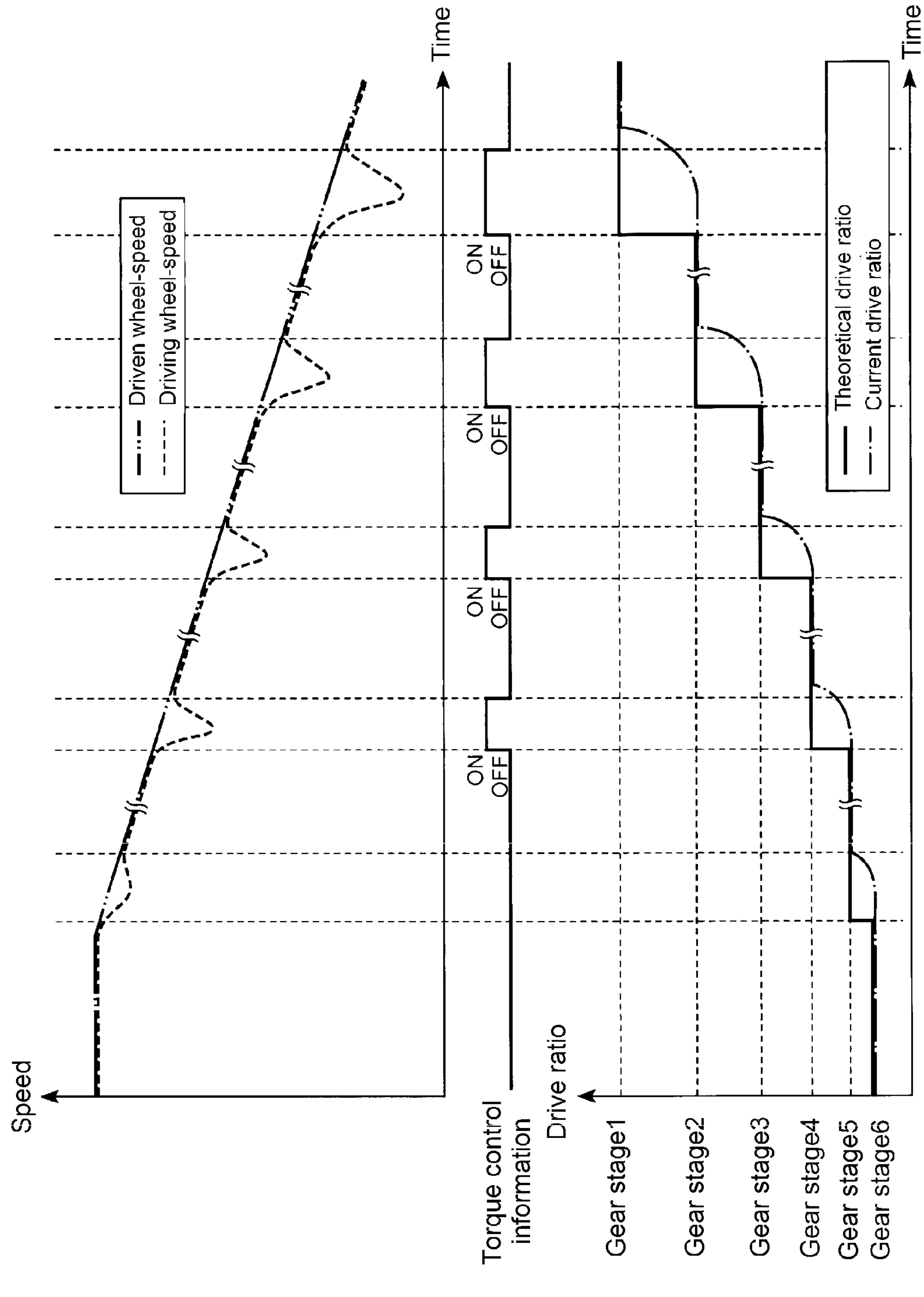
FIGS. 3(*a*), 3(*b*), and 3(*c*) illustrate a state where the control is performed by shifting down a gear stage while practically travelling, and by using the torque control device of the present invention.
Figure 4:
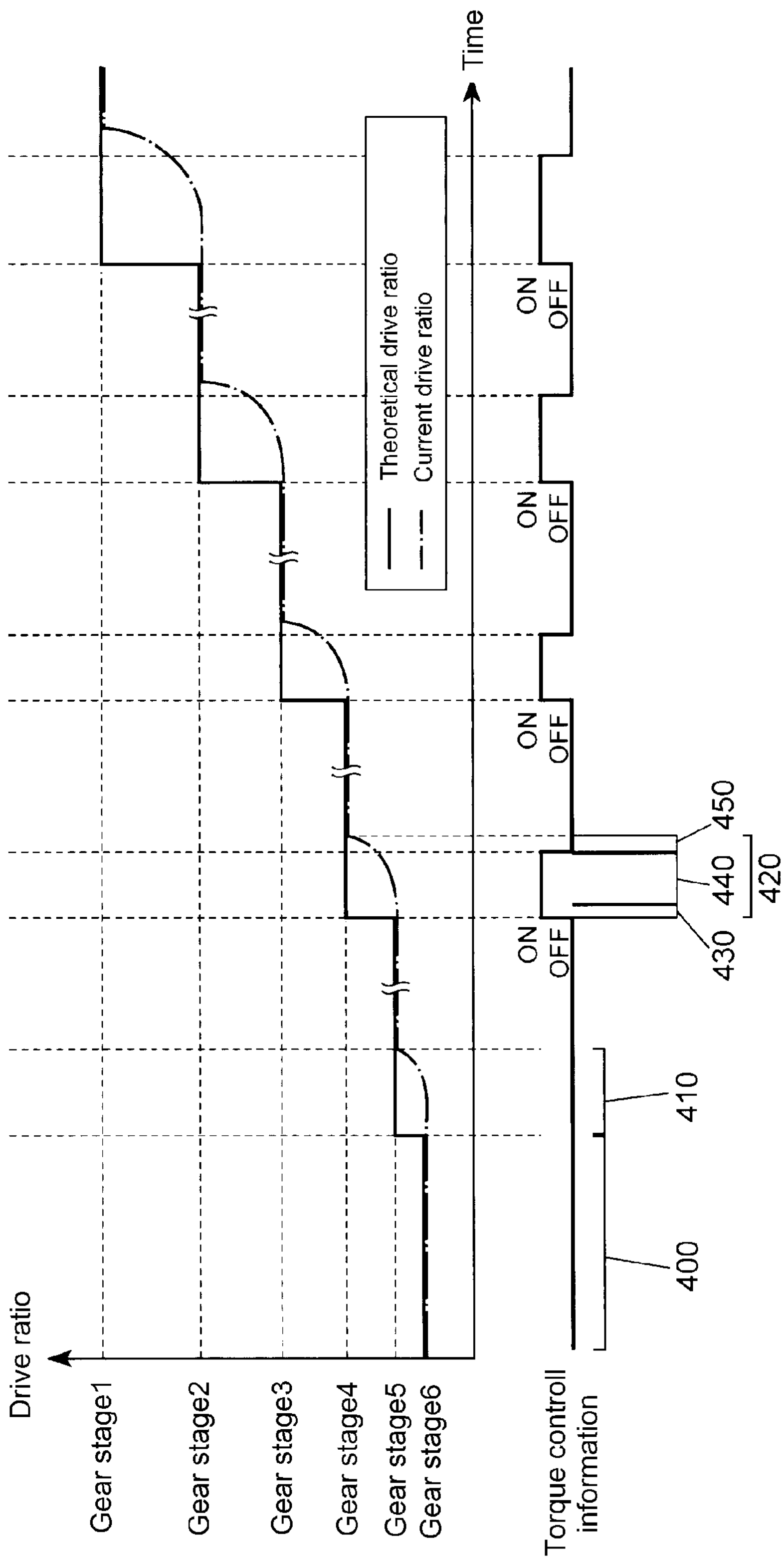
FIG. 4 is a view which extracts a vertical positional relationship in FIGS. 3(*b*) and 3(*c*) after it is reversed, and illustrates the torque control information in detail.

FIG. 1 schematically illustrates a configuration of a torque control device 100 of the present invention, and is a block diagram of the torque control device 100 which has a vehicle engine 200, a gear box 210, a plurality of sprockets 220 and 220, a belt 230, such as a link plate chain, which is wound around the sprockets 220 and 220, a driving wheel 240 which corresponds to a rear wheel of a vehicle, a brake 250 which brakes the driving wheel 240, the torque control means 300 for controlling the torque when shifting down a gear, and an external information source 260 including various sensors that electrically connected to the torque control means 300, embedded therein. FIG. 2 is a view of a flow of determination of the initiation of control intervention of output torque by the torque control means 300 of the present invention when shifting down the gear. FIG. 3(*a*) is a view schematically illustrating a relationship between a driven wheel speed and a driving wheel speed, and time when shifting down the gear. FIG. 3(*b*) is a view schematically illustrating torque control information which shows the presence or the absence of the control intervention of the output torque when shifting down the gear. FIG. 3(*c*) is a view schematically illustrating a relationship between a theoretical drive ratio and a current drive ratio when shifting down the gear. In addition, FIG. 4 is a view which extracts a vertical positional relationship in FIGS. 3(*b*) and 3(*c*) after it is reversed, and illustrates the torque control information in detail.

The torque control device illustrated in FIG. 1 which includes the torque control means 300 of the embodiment is provided with the vehicle engine 200, the gear box 210 for transferring the torque (driving force) from the vehicle engine 200, a chain or the belt 230 which is wound around between the sprocket 220 on an input side and the sprocket 220 on an output side, the driving wheel 240 which is driven to be rotated by the transferred driving force, and the brake 250 for braking the driving force of the driving wheel 240. In addition, both the driving wheel 240 and the front wheel (not illustrated) which is a driven wheel have a vehicle wheel speed sensor attached thereto. In addition, in the specification, the "vehicle" means an object which has a plurality of vehicle wheels, such as two wheels, three wheels, and four wheels, and travels by transferring the power of a prime mover to the driving wheel.

In addition, the torque control device 100 includes the external information source 260 which includes a sensor box in which, for example, an acceleration sensor that detects acceleration of a vehicle body in an X-axis direction, in a Y-axis direction, and in a Z-axis direction, and a yaw rate sensor that detects a yaw rate of the vehicle body are stored. The external information source 260 can receive information from various sensors, such as a signal from a global positioning system (GPS) satellite for obtaining the acceleration of the vehicle, or an amount of expansion and contraction of a front fork of the front wheel which is the driven wheel.

Furthermore, the torque control device 100 is provided with the torque control means (ABS/DTC ECU) 300 which can use the information from the external information source 260 via communication means, such as a controller area network (CAN). The ABS-ECU is a control device which is mainly mounted on the vehicle, and performs the antilock brake control of the brake device to recover a gripping force of the vehicle wheel with respect to a road surface when a slip ratio of the vehicle wheel is equal to or greater than a predetermined threshold value during the braking (the braking by the engine brake is also included). In other words, the ABS-ECU is a device which plays a role of controlling the braking force in the brake 250, and is connected to an engine ECU (not illustrated) which is an engine control unit that controls the engine 200, in a wired or wireless manner, for example, by the controller area network (CAN) communication, so that the information can be mutually exchanged.

In addition, the main characteristics of the configuration of the present invention is that the torque control means 300 which can initiate the torque control in an early stage before a slip is practically generated at the rear wheel (driving wheel) due to the engine brake force that is exerted when a particularly sudden clutch connection operation, such as sudden clutch connection or an operation of shifting down the gear, is performed, is provided. More specifically, the torque control means 300 further functions as the DTC-ECU or the torque control unit, and includes a storage unit that stores a theoretical driving wheel rotating speed based on a correspondence relationship with a predetermined engine speed in each gear stage of a transmission of a vehicle; gear stage detection means for detecting the gear stage when currently travelling; engine speed detection means for detecting an engine speed; driving wheel rotating speed detection means for detecting a driving wheel rotating speed; and torque control means for controlling output torque. When a relative value of a calculated value which is calculated by using the detected driving wheel rotating speed with respect to a calculated value which is calculated by using the theoretical driving wheel rotating speed is equal to or greater than a first threshold value, the output torque is increased so that the current driving wheel rotating speed becomes close to the theoretical driving wheel rotating speed.

By employing the above-described configuration, the present invention can stabilize the vehicle body during the cornering in an early stage since it is possible to initiate early intervention of the output torque control with respect to the driving wheel 240 based on the basic information and travelling information including the engine speed and the driving wheel rotating speed, which are parameters in a driving system, before generation of the slip at the driving wheel 240 is detected. Furthermore, for example, when the cornering travelling is performed while shifting down the gear, it is preferable that the torque control means 300 initiates the control of the output torque in a case where a first gear stage that is a stage for a high speed is shifted down to a second gear stage that is a stage for a low speed. Accordingly, since the control intervention of the output torque is already performed when shifting down the gear, it is also possible to smoothly perform the acceleration thereafter. When the intervention of the output torque control is initiated after performing calculation by comparison of the rotating speed (or the front wheel speed) of the front wheel which is the driven wheel with the rotating speed (or the rear wheel speed) of the rear wheel which is the driving wheel 240 after the shift-down, and detecting the generation of the slip, the vehicle body is in an unstable state particularly when the cornering travelling of the motorcycle is performed. Therefore, anxiety of the driver about the overturn of the vehicle remarkably increases. For this reason, in the present invention, in order to make it possible to initiate the control intervention of the output torque in an early stage after shifting down the gear, by performing calculation using the basic information and the travelling information as information other than the slip, for example, using the theoretical driving wheel rotating speed and the current driving wheel rotating speed in a gear stage after the shift-down, the parameters of the driving system is used as an input value during the calculation without using any of the parameters of a driven system. In addition, the theoretical driving wheel rotating speed is a driving wheel rotating speed based on the correspondence relationship with the predetermined engine speed in each gear stage of a transmission of the vehicle.

The torque control means 300 further includes the theoretical drive ratio calculated from the predetermined engine speed and the theoretical driving wheel rotating speed as the basic information, and further includes drive ratio calculating means for calculating the current drive ratio from the engine speed and the driving wheel rotating speed which are detected based on the second gear stage; and calculating means for calculating a difference and/or a rate of the drive ratio from the theoretical drive ratio and the current drive ratio in the second gear stage. It is preferable that the relative value is the difference of the drive ratio and/or the rate of the drive ratio. In addition, the "drive ratio" here means a ratio between the engine speed and the driving wheel rotating speed, and for example, the drive ratio illustrated on a vertical axis of FIGS. 3(*c*) and 4 is illustrated as a ratio of the engine speed with respect to the driving wheel rotating speed, but may be a ratio which is inverse thereto.

In addition, the above-described relative value may be a difference and/or a rate between the theoretical driving wheel rotating speed and the detected driving wheel rotating speed. The control can be performed together with the control which uses the drive ratio when it is necessary to determine the torque control intervention with higher accuracy.

In the above-described two embodiments, it is preferable that the torque control means 300 ends the control of the output torque at the moment when the above-described relative value is equal to or less than a second threshold value which is smaller than a first threshold value set in advance. In addition, the first threshold value and the second threshold value are calculated from the basic information which is written into the storage unit of the ECU 300 in advance, and the travelling information during the travelling, and the first threshold value is set to be greater than the second threshold value. In addition, it is preferable that the first threshold value and the second threshold value can be set to be variable, and further, it is preferable that the control amount of the output torque is also determined based on the travelling information. Accordingly, since it is possible to change the setting of each threshold value and the control amount of the output torque according to a travelling state during the cornering travelling or linear travelling of the vehicle, particularly, the motorcycle, a state of the travelling road surface (for example, a flat road, an uphill road, a downhill road, a paved road, a graveled road, a slope, a wet road surface, or frozen road), or a posture of the vehicle (for example, a bank angle), it is possible to perform the control of the vehicle more accurately.

In the above-described embodiment, a gear position, the driving wheel rotating speed, and the engine speed are used as the travelling information for initiating the control intervention of the output torque and for setting each threshold value and the control amount of the output torque. However, further, it is preferable that the external sensor information, the clutch information, the torque information, the accelerator opening degree, and the engine valve opening degree are used alone or in combination thereof.

The gear position is detected by the gear stage detection means for detecting the gear stage, and it is also possible to initiate the control intervention of the output torque by using only the information of the gear position. In this configuration, it is also possible to end the control intervention of the output torque at the moment when the gear is at a neutral position in the middle of shifting down the gear.

The engine speed is detected by the rotating speed detection means, and it is possible to initiate the control intervention of the output torque by using only the engine speed. In this configuration, it is also possible to initiate the control intervention of the output torque at the moment when the engine speed or the amount of change thereof exceeds a predetermined threshold value.

The external sensor information is obtained from the acceleration sensor, the yaw rate sensor, and a bank angle detection device, which are stored in the external information source 260. For example, the torque control intervention of the output torque may be initiated at the moment when the bank angle is equal to or greater than a predetermined threshold value when shifting down the gear.

The clutch information is detected by the clutch connection detection means for detecting a physical connection state of the clutch disposed between the engine 200 and the gear box 210, for example. The torque control intervention of the output torque may be initiated at the moment when the torque control means 300 detects the clutch connection signal output from the clutch connection detection means, but it is preferable that the torque control intervention is initiated to increase the output torque so that the current driving wheel rotating speed becomes close to the theoretical driving wheel rotating speed when the above-described relative value is equal to or greater than the first threshold value when the clutch connection is performed. Accordingly, stability of the vehicle body is improved while travelling, driving feeling of the driver is also improved, and the control to increase the output torque is not performed in a state where the clutch is not connected. For this reason, the difference in the rotating speed of a clutch disk on the input side and on the output side when the clutch connection is performed is small, and it is possible to reduce the wear of both clutch disks when the clutch connection is performed. In addition, the disposition of the clutch is not limited to the above-described position if it is possible to transfer the power from the vehicle engine 200 to the driving wheel 240.

The accelerator opening degree is detected based on the opening state of a throttle valve by an accelerator opening degree sensor. The torque control intervention of the output torque may be initiated at the moment when the accelerator opening degree or the amount of change thereof exceeds the predetermined threshold value.

The torque control intervention of the output torque may be initiated at the moment when the engine torque or the amount of change thereof exceeds the predetermined threshold value.

The engine valve opening degree is detected by a throttle opening degree sensor. The torque control intervention of the output torque may be initiated at the moment when the engine valve opening degree or the amount of change thereof exceeds the predetermined threshold value.

Next, based on FIG. 2, zeroth to eighth steps S0 to S8 until the control intervention of the output torque is initiated according to the embodiment in which the initiation of the control intervention of the output torque is determined by using the drive ratio will be described. The determination of the control initiation of the torque is continuously performed while the vehicle is travelling (zeroth step S0).

First, based on the current gear stage, the current drive ratio based on the current engine speed and the current driving wheel rotating speed is calculated by the drive ratio calculating means (first step S1). Next, the theoretical drive ratio which corresponds to the current gear stage is selected by performing the calculation from the theoretical drive ratio which is stored in the storage unit of the torque control means (ABS/DTC ECU) 300 and is calculated from the theoretical driving wheel rotating speed based on the correspondence relationship with the predetermined engine speed in each gear stage of the transmission of the vehicle (second step S2). After this, the difference between the theoretical drive ratio calculated in the second step S2 and the current drive ratio calculated in the first step S1 is calculated (third step S3). Next, it is determined whether or not the difference calculated in the third step S3 is equal to or greater than the predetermined threshold value (hereinafter, referred to as the first threshold value) (fourth step S4). When the difference is equal to or greater than the first threshold value, it is determined that the intervention of the torque control is necessary, and the control by the torque control means 300 is initiated to increase the output torque to make the current drive ratio close to the theoretical drive ratio (sixth step S6).

When the difference of the drive ratio of the third step S3 is not equal to or greater than the first threshold value in the fourth step S4, as the next step, it is determined whether or not the difference of the drive ratio is equal to or less than a predetermined threshold value (hereinafter, referred to as the second threshold value) which is different from the first threshold value (fifth step S5). When the difference of the drive ratio is equal to or less than the second threshold ratio, the theoretical drive ratio and the current drive ratio are extremely close to each other. For this reason, it is determined that the control intervention of the output torque is not necessary, and at this time, the torque control is not performed (step S7).

After this, in the control intervention of the output torque initiated in the sixth step S6, as a result that the current drive ratio is close to the theoretical drive ratio by the control intervention, when the difference of the drive ratio is not equal to or greater than the first threshold value, that is, when the difference of the drive ratio is lower than the first threshold value, it is determined whether or not the difference of the drive ratio is equal to or less than the second threshold value in the fifth step S5. In addition, when it is determined that the difference of the drive ratio is equal to or less than the second threshold value, the current drive ratio becomes extremely close to the theoretical drive ratio. For this reason, the supply of the output torque is ended, and the torque control is ended (seventh step S7). In contrast to this, when the difference of the drive ratio is not equal to or less than the second threshold value, the control of the output torque is the same as the previous cycle, that is, the supply of the output torque continues (eighth step S8).

FIGS. 3(*a*), 3(*b*), and 3(*c*) illustrate a state where the gear stage is shifted down during the practical travelling, and a state when the control is performed by using the torque control device of the present invention. FIG. 3(*a*) is a view illustrating a relationship between the front wheel (driven wheel) speed and the rear wheel (driving wheel) speed, and time. FIG. 3(*b*) is a view illustrating a relationship between the torque control information (ON and OFF of the control) and time. In addition, FIG. 3(*c*) is a view illustrating a relationship between the current drive ratio and the theoretical drive ratio, and time. In the drawing which illustrates the progress of the drive ratio and the time in FIG. 3(*c*), it is ascertained that a large difference is generated between the driven wheel speed and the driving wheel speed, and between the theoretical drive ratio and the current drive ratio, and a period of ON time during which the torque control information is shown becomes longer in accordance with the difference, in a case where the gear is shifted down from the low speed gear, rather than in a case where the gear is shifted down from a high speed gear. In general, when a gear stage 6 is shifted down to a gear stage 5, the action of the engine brake is almost not generated, the difference which is illustrated in the drawings between the driven wheel speed and the driving wheel speed, and between the theoretical drive ratio and the current drive ratio is smaller than that of a case when the gear stage is shifted down to a much lower speed gear stage, and it is rare that the slip due to the action of the engine brake is generated. For this reason, in the control illustrated in the drawings, the control intervention of the output torque is not performed. However, whether or not to initiate the control intervention of the output torque is determined based on the first threshold value, and even in the control illustrated in the drawing, even when the gear is shifted down from a high speed gear stage, such as the gear stage 6, or sudden clutch connection is performed, it is possible to perform the control of the output torque by the change in the setting of the first threshold value as necessary. In addition, in FIG. 3, for convenience of description, a case where the gear stage is shifted down one by one is illustrated, but a case where the shift-down is performed by 2 or 3 stages or more is also assumed. For this reason, by taking this case into consideration, it is also possible to set the shift-down in accordance with the first and the second threshold values.

In addition, FIG. 4 is a view which extracts a vertical positional relationship in FIGS. 3(*b*) and 3(*c*) after it is reversed, and illustrates the torque control information in detail. As illustrated in FIG. 4, in a stable travelling region 400 which is a time region in which the vehicle travels maintaining the gear stage 6 and the theoretical drive ratio and the current drive ratio substantially match each other, the control intervention of the output torque is not performed. This state corresponds to the seventh step S7 of FIG. 2. In a first transition travelling region 410 which is a time region until the current drive ratio deviated from the theoretical drive ratio returns to the theoretical drive ratio when the gear stage 6 is shifted down to the gear stage 5, as can be ascertained from the torque control information of FIG. 3, the control intervention of the output torque is not performed, and this corresponds to the state of the eighth step S8 illustrated in FIG. 2.

Next, torque control in a second transition travelling region 420 which is a time region until the current drive ratio deviated from the theoretical drive ratio returns to the theoretical drive ratio when the gear stage 5 is shifted down to the gear stage 4 will be described. The second transition travelling region 420 is divided into three regions, such as a first control region 430, a second control region 440, and a third control region 450, and the torque control information becomes ON from OFF. This means that the difference between the current drive ratio and the theoretical drive ratio is equal to or greater than the first threshold value in the fourth step S4 of FIG. 2, and the control intervention of the output torque by the torque control means 300 is initiated (sixth step S6). Since the control intervention is initiated after shifting down the gear in an extremely early stage, it is possible to suppress the slip in an early stage. After initiating the control intervention in the first control region 430 of the second transition travelling region 420, the control intervention continues until the difference of the drive ratio becomes equal to or less than the second threshold value in FIG. 2 in the second control region 440 (eighth step S8), and the control intervention is ended at the moment when the difference of the drive ratio becomes equal to or less than the second threshold value in the third control region 450 (seventh step S7). The control which is similar to the control in the second transition travelling region 420 is performed even when the shift-down from the gear stage 4 to the gear stage 3, from the gear stage 3 to the gear stage 2, and the gear stage 2 to the gear stage 1, is performed. In addition, in the embodiment of FIG. 3, an example of six gear stages in total is illustrated, but according to the specific configuration of the vehicle on which the torque control device 100 according to the present invention is mounted, it is possible to change the number of gear stages. Furthermore, as can also be ascertained in FIG. 3, the width of ON of the torque control information may vary in accordance with the gear stage, and it is possible to set an upper time limit so that the vehicle body is not suddenly accelerated. It is preferable that the control time is set to be variable, for example, from several tens of microseconds order to several hundreds of microseconds order. In addition, when the gear stage is at the neutral position, it is possible to cancel the control to increase the output torque.

In the embodiment of FIGS. 2 to 4, by using the difference between the theoretical drive ratio calculated in the second step S2 and the current drive ratio calculated in the first step S1, the first threshold value and the second threshold value are compared. However, the "rate of the drive ratio" calculated from the theoretical drive ratio selected in the second step S2 and the current drive ratio calculated in the first step S1, may be used in comparison with the first threshold value and the second threshold value together with or instead of the "difference of the drive ratio".

The torque control device 100 of the present invention determines whether or not to perform the control intervention of the output torque when the gear is shifted down by mainly using the gear position, the engine speed, and the driving wheel rotating speed in the travelling information, the period of time until the control intervention after the shift-down is shorter compared to that of the related art in which the control intervention is performed after the driven wheel speed and the driving wheel speed are compared and the slip is generated, and it is possible to increase the output torque in an early stage before the slip is generated. For this reason, it is possible to suppress generation of the slip.

In addition, the above-described control of the present invention may be combined with the control which performs the intervention of the torque after comparing the front and rear wheel speed and detecting the slip similarly to the related art.

Furthermore, as a torque control method which uses the above-described torque control device, for example, a configuration in which the gear stage, the engine speed, and the driving wheel rotating speed are detected while currently travelling, and the output torque is increased so that the current driving wheel rotating speed becomes close to the theoretical driving wheel rotating speed when the relative value of the calculated value calculated by using the detected driving wheel rotating speed with respect to the calculated value calculated by the theoretical driving wheel rotating speed is equal to or greater than the first threshold value, may be employed.

The above-described embodiment relates to a vehicle on which the engine 200 is mounted, but those skilled in the art can use an electric motor 200A as a power source of the vehicle, and can also apply the above-described embodiment of the present invention to an electric vehicle 100A which transfers an output (motor output torque) from the electric motor 200A to the driving wheel 240 via the transmission, as another embodiment written aside in FIG. 1. The output of the motor torque is based on a current or a voltage supplied to the electric motor 200A from a battery which is not illustrated.

The main characteristics of the configuration of another embodiment of the present invention is that there is provided motor torque control means 300A which can initiate the motor torque control in an early stage before a slip is practically generated at the rear wheel (driving wheel) because the rotating speed of the driving wheel 240 is not the theoretical driving wheel rotating speed that corresponds to a motor rotating speed in a gear stage after the shift-down when a particularly sudden clutch connection operation, such as sudden clutch connection or an operation of shifting down the gear, is performed. More specifically, the motor torque control means 300A further functions as the DTC or the motor torque control unit, and includes a storage unit that stores a theoretical driving wheel rotating speed based on a correspondence relationship with a predetermined motor rotating speed in each gear stage of a transmission of an electric vehicle; gear stage detection means for detecting the gear stage when currently travelling; motor rotating speed detection means for detecting a motor rotating speed; driving wheel rotating speed detection means for detecting a driving wheel rotating speed; and the motor torque control means 300A for controlling motor output torque. When a relative value of a calculated value which is calculated by using the detected driving wheel rotating speed with respect to a calculated value which is calculated by using the theoretical driving wheel rotating speed is equal to or greater than a first threshold value, the motor output torque is increased so that the current driving wheel rotating speed becomes close to the theoretical driving wheel rotating speed.

By employing the above-described configuration, the present invention can stabilize the vehicle body during the cornering in an early stage since it is possible to initiate early intervention of the motor output torque control with respect to the driving wheel 240 based on the basic information and travelling information including the motor engine speed and the driving wheel rotating speed, which are parameters in a driving system, before generation of the slip at the driving wheel 240 is detected. Furthermore, for example, when the cornering travelling is performed while shifting down the gear, it is preferable that the motor torque control means 300A initiates the control of the motor output torque in a case where the gear is shifted down from a first gear stage that is a stage for a high speed to a second gear stage that is a stage for a low speed. Accordingly, since the control intervention of the motor output torque is already performed when shifting down the gear, it is also possible to smoothly perform the acceleration thereafter. When the intervention of the motor output torque control is initiated after performing calculation by comparison of the rotating speed of the front wheel (or the front wheel speed) which is the driven wheel with the rotating speed of the rear wheel (or the rear wheel speed) which is the driving wheel 240 after the shift-down, and detecting the generation of the slip, the vehicle body is in an unstable state particularly when the motorcycle cornering-travels. Therefore, anxiety of the driver about the overturn of the vehicle remarkably increases. For this reason, in another embodiment of the present invention, in order to make it possible to initiate the control intervention of the motor output torque in an early stage after shifting down the gear, by performing calculation using the basic information and the travelling information as information other than the slip, for example, using the theoretical driving wheel rotating speed and the current driving wheel rotating speed in a gear stage after the shift-down, the parameters of the driving system is used as an input value during the calculation without using any of the parameters of a driven system. In addition, in another embodiment of the present invention, the theoretical driving wheel rotating speed is a driving wheel rotating speed based on a correspondence relationship with a predetermined motor rotating speed in each gear stage of a transmission of the motor vehicle.

INDUSTRIAL APPLICABILITY

According to the present invention, since it is possible to perform determination of control intervention of output torque by using an engine speed and a driving wheel rotating speed of a driving system, it is possible to perform the intervention of torque control in an earlier stage than that of the related art in which the control intervention of the output torque is initiated after detecting a slip based on the driven wheel rotating speed and the driving wheel rotating speed. As a result, it is possible to prevent a vehicle body from being unstable due to the slip, to give the driver a relief, and to avoid the overturn of the vehicle.

REFERENCE SIGNS LIST

100 torque control device
100A motor torque control device
200 engine
200 A electric motor
210 gear box
220 sprocket
230 chain, belt
240 driving wheel (or rear wheel)
250 brake
260 external information source
300 torque control means (or ABS/DTC ECU)
300A motor torque control means
400 stable travelling region
410 first transition travelling region
420 second transition travelling region
430 first control region
440 second control region
450 third control region

The invention claimed is:

1. A vehicular torque control device, comprising:
a storage unit;
gear stage detection means for detecting the gear stage of a transmission of a vehicle in current travelling;
engine speed detection means for detecting an engine speed of the vehicle in current travelling;
driving wheel rotating speed detection means for detecting a driving wheel rotating speed of the vehicle in current travelling; and
torque control means for controlling output torque of an engine of the vehicle in current travelling,
wherein the storage unit stores theoretical drive ratios corresponding with the gear stages respectively, and
wherein, when a first gear stage is shifted down to a second gear stage, the torque control means makes the output torque increase, in the case that a relative value of a current drive ratio calculated on the basis of the engine speed and the driving wheel rotating speed with respect to the theoretical drive ratio corresponding with the second gear stage is equal to or greater than a first threshold value, so that the current drive ratio becomes close to the theoretical drive ratio corresponding with the second gear stage.

2. The vehicular torque control device according to claim 1, wherein the relative value is the difference and/or the rate of the drive ratio.

3. The vehicular torque control device according to claim 1, further comprising:
clutch connection detection means for detecting clutch connection,
wherein the torque control means controls the output torque based on a clutch connection signal from the clutch connection detection means.

4. The vehicular torque control device according to claim 1,
wherein the torque control means ends the control of the output torque at the moment when the relative value is equal to or less than a second threshold value which is smaller than the first threshold value and is set in advance.

5. The vehicular torque control device according to claim 4, wherein the first threshold value and the second threshold value are calculated from at least one type of travelling information among the detected gear stage, the detected engine speed, and the detected driving wheel rotating speed, and wherein the first threshold value and the second threshold value are variably set.

6. The vehicular torque control device according to claim 5, wherein the travelling information further includes at least one of external sensor information, clutch information, torque information, an accelerator opening degree, and an engine valve opening degree.

7. The vehicular torque control device according to claim 5, wherein a control amount of the output torque is determined based on the travelling information.

8. A motor torque control device for an electric vehicle, comprising:

a storage unit;

gear stage detection means for detecting a gear stage of a transmission of the electric vehicle, which uses an electric motor as a power source, in current travelling;

motor rotating speed detection means for detecting a motor rotating speed of the electric motor in current travelling;

driving wheel rotating speed detection means for detecting a driving wheel rotating speed of the electric vehicle in current travelling; and motor torque control means for controlling motor output torque of the electric motor in current travelling, wherein the storage unit stores theoretical drive ratios corresponding with the gear stages respectively, and wherein, when a first gear stage is shifted down to a second gear stage, the motor torque control means makes the motor output torque increase, in the case that a relative value of a current drive ratio calculated on the basis of the motor rotating speed and the driving wheel rotating speed with respect to the theoretical drive ratio corresponding with the second gear stage is equal to or greater than a first threshold value, so that the current drive ratio becomes close to the theoretical drive ratio corresponding with the second gear stage.

9. A vehicular torque control method which uses a torque control device, including a storage unit; gear stage detection means for detecting a gear stage of a transmission of a vehicle in current travelling; engine speed detection means for detecting an engine speed of the vehicle in current travelling; driving wheel rotating speed detection means for detecting a driving wheel rotating speed of the vehicle in current travelling; and torque control means for controlling output torque of an engine of the vehicle in current travelling, the storage unit storing theoretical drive ratios corresponding with the gear stages respectively, the method comprising:

increasing, when a first gear stage is shifted down to a second gear stage, the output torque, in the case that a relative value of a current drive ratio calculated on the basis of the engine speed and the driving wheel rotating speed with respect to the theoretical drive ratio corresponding with the second gear stage is equal to or greater than a first threshold value, so that the current drive ratio becomes close to the theoretical drive ratio corresponding with the second gear stage.

10. The vehicular torque control method according to claim 9, wherein the relative value is the difference and/or the rate of the current drive ratio with respect to the theoretical drive ratio.

11. The vehicular torque control method according to claim 9, further comprising:

detecting clutch connection; and increasing the output torque based on a clutch connection signal from clutch connection detection means.

12. The vehicular torque control method according to claim 9, further comprising:

ending the control of the output torque at the moment when the relative value is equal to or less than a second threshold value which is smaller than the first threshold value and is set in advance.

13. The vehicular torque control method according to claim 12, further comprising:

calculating the first threshold value and the second threshold value from at least one type of travelling information among the detected gear stage, the detected engine speed, or the detected driving wheel rotating speed, wherein the first threshold value and the second threshold value are variably set.

14. The vehicular torque control method according to claim 13, wherein the travelling information further includes at least one of external sensor information, clutch information, torque information, an accelerator opening degree, and an engine valve opening degree.

15. The vehicular torque control method according to claim 13, further comprising:

determining a control amount of the output torque based on the travelling information.

16. A motor torque control method for an electric vehicle which uses a motor torque control device, including a storage unit; gear stage detection means for detecting a gear stage of a transmission of the electric vehicle, which uses an electric motor as a power source, in current travelling; motor rotating speed detection means for detecting a motor rotating speed of the electric motor in current travelling; driving wheel rotating speed detection means for detecting a driving wheel rotating speed of the electric vehicle in current travelling; and motor torque control means for controlling motor output torque of the electric motor in current travelling, the storage unit storing theoretical drive ratios corresponding with the gear stages respectively, the method comprising:

increasing, when a first gear stage is shifted down to a second gear stage, the motor output torque, in the case that a relative value of a current drive ratio calculated on the basis of the motor rotating speed and the driving wheel rotating speed with respect to the theoretical drive ratio corresponding with the second gear stage is equal to or greater than a first threshold value, so that the current drive ratio becomes close to the theoretical drive ratio corresponding to the second gear stage.

* * * * *